(12) United States Patent
Mirza (10) Patent No.: US 9,992,101 B2
(45) Date of Patent: Jun. 5, 2018

(54) PARALLEL MULTIPATH ROUTING ARCHITECTURE

(71) Applicant: Taric Mirza, Atlanta, GA (US)

(72) Inventor: Taric Mirza, Atlanta, GA (US)

(73) Assignee: Taric Mirza, Atlanta, GA (US)

( * ) Notice: Subject to any disclaimer, the term of this patent is extended or adjusted under 35 U.S.C. 154(b) by 182 days.

(21) Appl. No.: 14/948,561

(22) Filed: Nov. 23, 2015

(65) Prior Publication Data

US 2016/0149804 A1    May 26, 2016

Related U.S. Application Data

(60) Provisional application No. 62/083,532, filed on Nov. 24, 2014.

(51) Int. Cl.
| | | |
|---|---|---|
| *H04L 12/707* | (2013.01) | |
| *H04L 12/715* | (2013.01) | |
| *H04L 12/725* | (2013.01) | |

(52) U.S. Cl.
CPC ............ *H04L 45/24* (2013.01); *H04L 45/306* (2013.01); *H04L 45/64* (2013.01)

(58) Field of Classification Search
CPC ....... H04L 45/64; H04L 45/306; H04L 45/24; H04L 45/00; H04L 45/245; H04L 45/30
See application file for complete search history.

(56) References Cited

U.S. PATENT DOCUMENTS

| | | | |
|---|---|---|---|
| 7,707,300 B1* | 4/2010 | Champagne | ........ H04L 12/4625 709/231 |
| 9,614,870 B2† | 4/2017 | Bartlett | |
| 2009/0073291 A1 | 3/2009 | Yoneda et al. | |
| 2009/0073921 A1* | 3/2009 | Ji | ............................. H04L 45/00 370/328 |
| 2013/0132604 A1* | 5/2013 | Cohen | ................. H04W 76/025 709/231 |
| 2014/0297785 A1 | 10/2014 | Galles et al. | |

(Continued)

FOREIGN PATENT DOCUMENTS

| | | |
|---|---|---|
| EP | 2996289 A1 | 3/2016 |
| WO | WO-2017/184807 A1 | 10/2017 |

OTHER PUBLICATIONS

International Search Report and Written Opinion dated Jul. 10, 2017 by the International Searching Authority for Patent Application No. PCT/US2017/028504, which was filed on Apr. 20, 2017 and published as WO 2017/184807 on Oct. 26, 2017 (Inventor—Taric Mirza; Applicant-Thalonet, Inc.) (9 pages).

*Primary Examiner* — Ian N. Moore
*Assistant Examiner* — Brian T Le
(74) *Attorney, Agent, or Firm* — Ballard Spahr LLP (57) ABSTRACT

Disclosed are various embodiments for a parallel multipath routing architecture. An edge node of an overlay network receives packets to be communicated to a destination network address. The received packets are encoded for communication through multiple paths of the overlay network leading to a second edge node communicatively coupled to the destination network address. The packets are duplicated across the multiple paths to minimize the likelihood of packet loss. The second edge node discards duplicated instances of the packets and regenerates the original packets for forwarding to the destination network address.

18 Claims, 7 Drawing Sheets

(56) References Cited

U.S. PATENT DOCUMENTS

| | | |
|---|---|---|
| 2015/0188823 A1 | 7/2015 | Williams et al. |
| 2015/0358348 A1* | 12/2015 | Bartlett ............... H04L 63/1458 726/12 |
| 2015/0358668 A1 | 12/2015 | Akimchuk, III et al. |
| 2016/0072669 A1 | 3/2016 | Saavedra |
| 2016/0149804 A1 | 5/2016 | Mirza |
| 2016/0337223 A1* | 11/2016 | Mackay ............... H04L 43/0888 |

\* cited by examiner
† cited by third party

"PARALLEL MULTIPATH ROUTING ARCHITECTURE"

CROSS-REFERENCE TO RELATED APPLICATIONS

This application claims priority to U.S. Application Ser. No. 62/083,532 titled "PARALLEL MULTIPATH ROUTING ARCHITECTURE", filed Nov. 24, 2014, which is incorporated herein by reference in its entirety.

BACKGROUND

Consumers of internet access may participate in activities that can be negatively impacted by packet loss. For example, players of networked video games, stock traders, and participants in activities where time or speed is essential may be negatively affected due to lost packets that must be resent.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Internet access consumers may experience performance degradation due to packet loss. For example, a player in a networked video game may experience packet loss between the player and a server. Additional resources must be used in order to resend a lost packet between the player and server, which may introduce lag, speed degradation, and other issues that may affect many players. As another example, stock traders communicating with a trading system may experience delays in consummating transactions due to additional resource expenditure in resending lost packets.

A parallel multipath architecture implements an overlay network on existing Internet Protocol network frameworks. The overlay network includes edge nodes communicatively coupled to communication endpoints. Relay nodes are communicatively coupled to the edge nodes and other relay nodes. Packets from a source communication endpoint are modified at an edge node to include metadata including sequence numbers, destination network address information, or other data. The edge node forwards the packets along multiple parallel paths of relay nodes within the overlay network. An edge node communicatively coupled to the destination communication endpoint removes the added metadata, discards duplicate packets, and forwards the sequenced payloads to the destination. By implementing multiple parallel paths between a source and destination, packet loss is reduced as a packet must be lost along each path in which it is sent in order to be lost. In the following discussion, a general description of the system and its components is provided, followed by a discussion of the operation of the same.

Figure 1A:
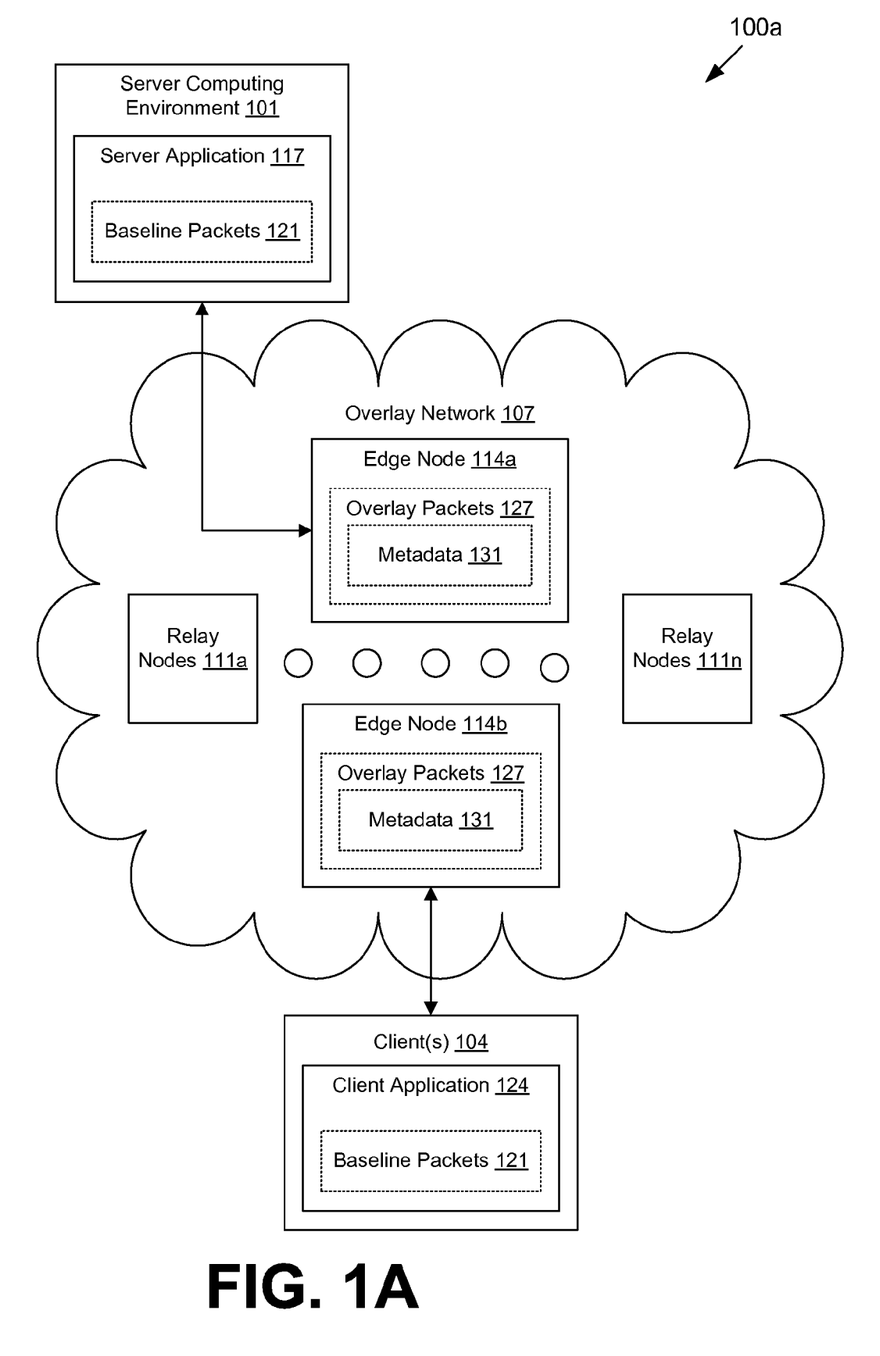
FIG. 1A is a drawing of a networked environment according to various embodiments of the present disclosure.

With reference to FIG. 1A, shown is a networked environment 100a according to various embodiments. The networked environment 100a includes a server computing environment 101, a client 104, which are in data communication with each other via an overlay network 107. The overlay network 107 includes, for example, the Internet, wired networks, wireless networks, or other suitable networks, etc., or any combination of two or more such networks. For example, such networks may comprise satellite networks, cable networks, Ethernet networks, and other types of networks.

To this end, the overlay network 107 comprises one or more relay nodes 111a-n and edge nodes 114a/b, which can include a subset of network components or nodes of a network upon which the overlay network 107 lies. Relay nodes 111a-n are communicatively coupled to other relay nodes 111a-n and/or to edge nodes 114a/b. Edge nodes 114a/b are communicatively coupled to relay nodes 111a-n or network source or destination endpoints, such as the server computing environment 101 and client 104. Relay nodes 111a-n may correspond to data centers, network locations, routers, communications nexus, or other network components communicatively coupled to other relay nodes 111a-n and edge nodes 114a/b via an overlay network approach. For example, relay nodes 111a-n may be communicatively coupled to other relay nodes 111a-n or edge nodes 114a/b using tunneling, including Transmission Control Protocol (TCP) over Internet Protocol (IP)/Universal Datagram Protocol (UDP) tunneling, UDP over IP/UDP tunneling, Secure Shell (SSH) tunneling, Virtual Private Networks (VPNs), or other approaches as can be appreciated.

The edge nodes 114a/b may include dedicated networking devices, such as routers, switches, or other devices configured to perform the operations of edge nodes 114a/b as will be described below. The edge nodes 114a/b may also include software, applications, services, or other functionality configured to perform the operations of edge nodes 114a/b and executed in one or more computing devices. Although, in this example embodiment, the edge nodes 114a/b are shown as distinct from the server computing environment 101 and client 104, it is understood that the edge nodes 114a/b may also include components or functionality executed within the server computing environment 101 or client 104. As a non-limiting example, a client 104 may be configured to execute an application facilitating the operations of an edge node 114b as can be appreciated.

The server computing environment 101 may comprise, for example, a server computer or any other system providing computing capability. Alternatively, the server computing environment 101 may employ a plurality of computing devices that may be arranged, for example, in one or more server banks or computer banks or other arrangements. Such computing devices may be located in a single installation or may be distributed among many different geographical locations. For example, the server computing environment 101 may include a plurality of computing devices that together may comprise a hosted computing resource, a grid computing resource and/or any other distributed computing arrangement. In some cases, the server computing environment 101 may correspond to an elastic computing resource where the allotted capacity of processing, network, storage, or other computing-related resources may vary over time.

Various applications and/or other functionality may be executed in the server computing environment 101 according to various embodiments. The components executed on the server computing environment 101, for example, include a server application 117, and other applications, services, processes, systems, engines, or functionality not discussed in detail herein. The server application 117 is executed to communicate baseline packets 121 of data to and receive baseline packets 121 of data from a client 104 via the overlay network 107.

The client 104 is representative of a plurality of client devices that may be coupled to the overlay network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 104 may be configured to execute various applications such as a client application 124 and/or other applications. The client application 124 may be executed in a client 104, for example, to access network content served up by the server computing environment 101 and/or other servers, thereby rendering a user interface on the display. To this end, the client application 124 may comprise, for example, a browser, a dedicated application, etc., and the user interface may comprise a network page, an application screen, etc. The client 104 may be configured to execute applications beyond the client application 124 such as, for example, email applications, social networking applications, word processors, spreadsheets, and/or other applications. The client application 124 may be configured, for example, to generate baseline packets 121 for communication to the server computing environment 101. The client application 124 may also be configured to access data of baseline packets 121 received from the server computing environment 101 to perform its functionality.

Next, a general description of the operation of the various components of the networked environment 100a is provided. To begin, a client application 124 generates one or more baseline packets 121 for communication to a server application 117 executed in the server computing environment 101. The baseline packets 121 may be encoded, for example, for communication according to Transmission Control Protocol (TCP), Universal Datagram Protocol (UDP), Internet Protocol (IP), or another protocol. The baseline packets 121 are then obtained by an edge node 114b communicatively coupled to the client 104.

In some embodiments, the edge node 114b may comprise a router, switch, server, or other dedicated network component distinct from the client 104. In such an embodiment, obtaining the baseline packets 121 may include intercepting or otherwise capturing the baseline packets 121 as forwarded by the client 104. In other embodiments, the client 104 may be considered the edge node 114b. In such an embodiment, the client 104 may be configured to execute an application or service to intercept or access the baseline packets 121 prior to forwarding to the overlay network 107.

After obtaining the baseline packets 121, the edge node 114b generates overlay packets 127 from the baseline packets 121. In some embodiments, the baseline packets 121 are included in a data payload of the overlay packets 127. In other embodiments, generating the overlay packets 127 may include splitting the baseline packets 121 into smaller portions of data. For example, baseline packets 121 may be split such that the resulting overlay packets 127 conform to a Maximum Transmission Unit (MTU) size of a link in the overlay network 107, or by another approach. In such an embodiment, the split portions of baseline packets 121 may correspond to respective data payloads of overlay packets 127.

Generating the overlay packets 127 may also include generating metadata 131 for the respective overlay packets 127. Metadata 131 may include, for example, sequence numbers corresponding to a sequence of the encoded baseline packets 121. Metadata 131 may also include routing data such as, for example, a network address of the client 104, an originating port of the client 104, a network address or port of the server application 117 or server computing environment 101 to which the baseline packets 121 will be communicated, a network address or port of an edge node 114a to which the overlay packets 127 will be communicated, and potentially other data. Metadata 131 may also include, for example, authentication data, session identifiers, unique identifiers, or other data facilitating an authentication or identification of a client 104. Generating overlay packets 127 may also include applying an encryption algorithm to all or a portion of the baseline packet 121, overlay packet 127, or performing other operations.

The edge node 114b then forwards the overlay packets 127 to one or more relay nodes 111a-n in the overlay network 107. In some embodiments, this may include performing a path finding operation applied to relay nodes 111a-n. For example, the edge nodes 114a/b and relay nodes 111a-n may be encoded or considered as a weighted graph. The weights of the graph may be based on network performance data such as latency between linked nodes, capacity of relay nodes 111a-n, or other data. The latency data, capacity data, or other data upon which a path is determined may be obtained by querying respective relay nodes 111a-n, obtained from a central data repository, monitoring service, data feed, or obtained by another approach. The edge node 114b may then determine a plurality of paths of the graph according to a lowest combined latency of the path, a lowest combined burden of the path, or other criteria.

After determining a plurality of paths, the edge node 114b then communicates the overlay packets 127 to a first relay node 111a-n in each of the respective paths. The relay nodes 111a-n then forward the overlay packets 127 to the edge node 114a via other relay nodes 111a-n in the overlay network 107. In some embodiments, the edge node 114b may have been configured to encode an indication of a routing path in the overlay packets 127. In such an embodiment, the relay nodes 111a-n would forward the overlay packets 127 according to the indicated routing path. In other embodiments, the relay nodes 111a-n may be configured to determine an optimal path to the edge node 114a similar to the approaches described above. In such an embodiment, the relay nodes 111a-n would then forward the overlay packets 127 to the next relay node 111a-n in a determined path.

Upon arrival at the edge node 114a, the edge node 114a generates the baseline packets 121 from the overlay packets 127. As the overlay packets 127 are sent along multiple paths in the overlay network 107, the edge node 114a may receive duplicate copies of one or more of the overlay packets 127. Accordingly, in some embodiments, this may include discarding duplicate overlay packets 127 as determined by a sequence number encoded in metadata 131, by applying a hashing algorithm to the overlay packets 127, or by another approach.

Generating the baseline packets 121 from the overlay packets 127 may also include removing metadata 131, packet headers, or other data added to the baseline packets 121 by the edge node 114b to generate the overlay packets 127. In embodiments in which the baseline packets 121 were split into components of reduced size, this may also include combining or reassembling the baseline packets 121. The baseline packets 121 may also be regenerated from the overlay packets 127 by another approach. The edge node 114a then forwards the baseline packets 121 to the server application 117.

Although the operation described above discusses baseline packets 121 generated by a client application 124 for communication to a server application 117, it is understood that baseline packets 121 may be similarly generated by a server application 117 for communication to the client application 124. In such an embodiment, the edge node 114a would generate overlay packets 127 from the baseline packets 121 for forwarding to an edge node 114b via relay nodes 111a-n.

Figure 1B:
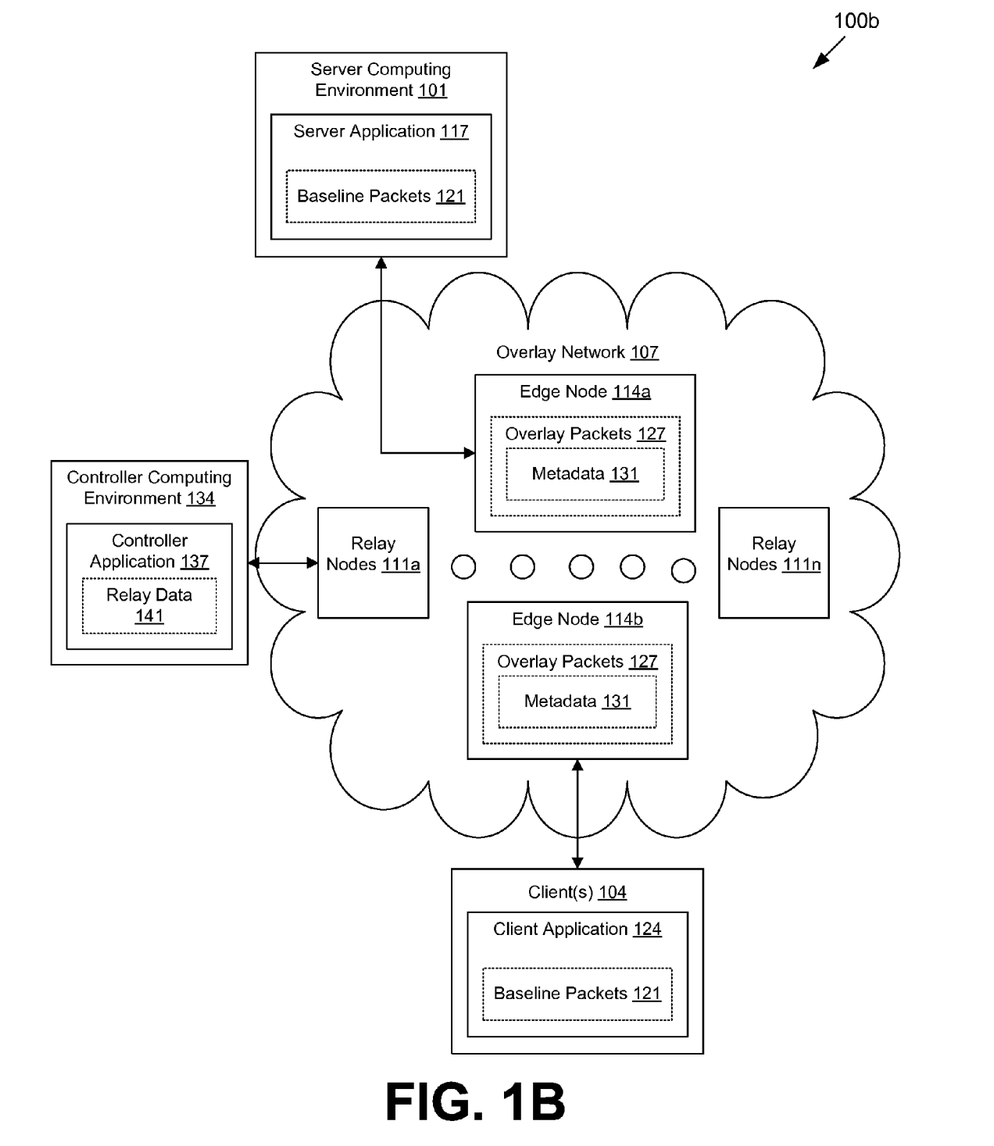
FIG. 1B is a drawing of a networked environment according to various embodiments of the present disclosure.

With reference to FIG. 1B, shown is a networked environment 100b according to various embodiments. The networked environment 100b includes components similar to the networked environment 100a of FIG. 1A, including a server computing environment 101, a client 104, which are in data communication with each other via an overlay network 107. Such components may perform operations similar to those set forth with respect to the discussion of FIG. 1A. Additionally, the networked environment 100b includes a controller computing environment 134 communicatively coupled to the overlay network 107.

The controller computing environment 134 may comprise, for example, a server computer or any other system providing computing capability. Alternatively, the controller computing environment 134 may employ a plurality of computing devices that may be arranged, for example, in one or more server banks or computer banks or other arrangements. Such computing devices may be located in a single installation or may be distributed among many different geographical locations. For example, the controller computing environment 134 may include a plurality of computing devices that together may comprise a hosted computing resource, a grid computing resource and/or any other distributed computing arrangement. In some cases, the controller computing environment 134 may correspond to an elastic computing resource where the allotted capacity of processing, network, storage, or other computing-related resources may vary over time.

Various applications and/or other functionality may be executed in the controller computing environment 134 according to various embodiments. The components executed on the controller computing environment 134, for example, include a controller application 137, and other applications, services, processes, systems, engines, or functionality not discussed in detail herein. The controller application 137 is executed to query relay nodes 111a-n for relay data 141 indicating an operational status of a respective relay node 111a-n. The relay data 141 may indicate, for example, a latency between the respective relay node 111a-n and another relay node 111a-n, edge node 114a/b, or other component of the overlay network 107. The relay data 141 may also indicate a current pending workload or capacity of the respective relay node 111a-n, or other data. Using the relay data 141, the controller application 137 may then determine an optimal route or portion of a route between edge nodes 114a/b.

Next, a general description of the operation of the various components of the networked environment 100b is provided. To begin, a client 104 communicates a request to the controller application 137 to establish a route between a corresponding edge node 114b and an edge node 114a of a server computing environment 101. In response to the request, the controller application 137 queries one or more relay nodes 114a-n for their relay data 141. Using the relay data 141, the controller application 137 uses a path finding or graph search algorithm to generate a plurality of routes between the edge nodes 114a/b according to the relay data 141. In some embodiments, the routes may be generated to minimize a latency between the edge node 114a and 114b. In other embodiments, the routes may be generated to avoid or preferably avoid the use of relay nodes 111a-n having a pending workload meeting or exceeding a threshold, or a capacity meeting or falling below another threshold.

After generating the routes, in some embodiments, the controller application 137 communicates an indication of the routes to the edge node 114b, such that overlay packets 127 may be encoded with an indication of a respective route. This allows the overlay packets 127 to be communicated to relay nodes 111a-n with an indication of a communications path through the overlay network 107.

In other embodiments, the controller application 137 communicates, to the edge node 114b, an indication of one or more first relay nodes 111a-n in the path. In such an embodiment, the controller application 137 may also communicate to relay nodes 111a-n included in the routes an indication of a respective subsequent relay node 111a-n to which overlay packets 127 should be forwarded. Thus, the edge node 114b and relay nodes 111a-n are only instructed a next node to which overlay packets 127 should be forwarded. In some embodiments, the forwarding instructions to the relay nodes 111a-n may be specific to overlay packets 127 to or from a particular client 104, client application 124, or destination edge node 114a. Thus, relay nodes 111a-n would select a next relay node 111a-n according to the received instructions and a source or destination of the overlay packets 127.

In further embodiments, the controller application 137 may repeatedly query the relay nodes 111a-n for relay data 141 at a predefined interval, in response to a request, or according to other criteria. For example, an edge node 114a/b, relay node 111a-n, or other component of the networked environment 100b may detect a network status such as a network component outage, a latency meeting or exceeding a threshold, or another event. The detecting component may then communicate a request to the controller application 137 to requery the relay nodes 111a-n for relay data 141. In such embodiments, the controller application 137 may then update the edge node 114b or relay nodes 111a-n with updated routes generated according to the updated relay data 141.

Although the operation described above discusses a controller application 137 generating routes between an edge node 114b and edge node 114a, it is understood that the controller application 137 may also generate routes between an edge node 114b and 114a under a similar approach, thereby facilitating communications between a server application 117 and client application 127.

Figure 2:
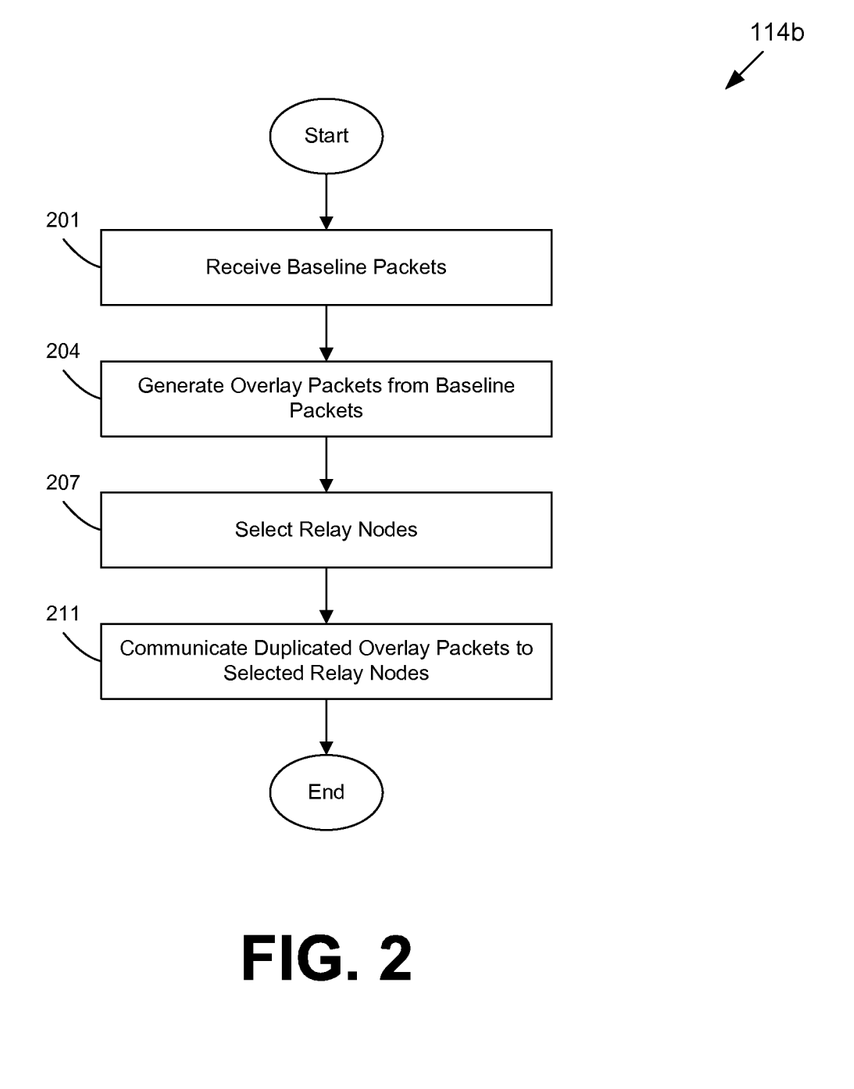
FIG. 2 is a flowchart illustrating one example of functionality implemented as portions of an edge node 114b in the networked environment of FIG. 1A or FIG. 1B according to various embodiments of the present disclosure.

Referring next to FIG. 2, shown is a flowchart that provides one example of the operation of a portion of the edge node 114b according to various embodiments. It is understood that the flowchart of FIG. 2 provides merely an example of the many different types of functional arrangements that may be employed to implement the operation of the portion of the edge node 114b as described herein. As an alternative, the flowchart of FIG. 2 may be viewed as depicting an example of elements of a method implemented in the edge node 114b according to one or more embodiments.

Beginning with box 201, the edge node 114b receives baseline packets 121 (FIG. 1A) for communication to a network destination address via the overlay network 107 (FIG. 1A). In some embodiments, the baseline packets 121 may be received from a client application 124 (FIG. 1A) or other application executed in a client 104 (FIG. 1A) communicatively coupled to the edge node 114b. For example, the edge node 114b may serve as a router, switch, access point, modem, or other networking device in communication with the client 104. In other embodiments, the client 104 may serve as the edge node 114b, and the baseline packets 121 are received by a process or application distinct from a client application 124 or other application executed within the client 104.

Next, in box 204, the edge node 114b generates overlay packets 127 (FIG. 2) from the received baseline packets 121. In some embodiments, this includes generating the overlay packets 127 as having a data payload including a corresponding baseline packet 121. In other embodiments, the edge node 114b may split the baseline packets 121 into multiple data portions, with each data portion serving as a data payload for an overlay packet 127. In such an embodiment, the baseline packets 121 may be split such that the overlay packet 127 having the payload of the resulting data portions satisfy a Maximum Transmission Unit (MTU) size or other threshold. The MTU size may be defined according to a relay node 111a-n (FIG. 1A) or other component of the overlay network 107.

Generating the overlay packets 127 may also include generating metadata 131 (FIG. 1A) for the overlay packets 127. Such metadata 131 can include sequence numbers or other identifying information, integrity or verification data such as a hash value, cyclical redundancy check value, or other data. The metadata 131 can also include login credentials or other identifying information corresponding to a client 104 or a user account. The metadata 131 may also include indications of relay nodes 111a-n or paths of the overlay network 107 through which the packets should be communicated, as will be described in more detail below. The metadata 131 can also include other data. Generating the overlay packets may further include applying an encryption algorithm to the baseline packets 121 or other portions of the overlay packets 127.

Next, in box 207, the edge node 114b selects one or more relay nodes 111a-n to which the overlay packets 127 will be communicated. In some embodiments, this may include performing a path finding operation on relay nodes 111a-n to select a plurality of paths of the overlay network 107 leading to an edge node 114a (FIG. 1A). The path finding operation may be performed based on a weighted graph of relay nodes 111a-n, with weights based on capacity or latency of relay nodes 111a-n, computational overhead, or other criteria. In such an embodiment, the edge node 114b may then select a plurality of paths based on the path finding operation. The edge node 114b would then select the relay nodes 111a-n as the first relay node 111a-n for each of the selected paths. In such an embodiment, the edge node 114b may encode an indication of a selected path for a corresponding duplicate set of overlay packets 127, indicating through which path the corresponding overlay packets 127 should be communicated. In other embodiments, the edge node 114b may select one or more relay nodes 111a-n based on the capacity, latency, nearness, or other criteria of communicatively adjacent relay nodes 111a-n. After selecting the relay nodes 111a-n, in box 211, the edge node 114b communicates a copy of the overlay packets 127 to each of the selected relay nodes 111a-n, after which the process ends.

Figure 3:
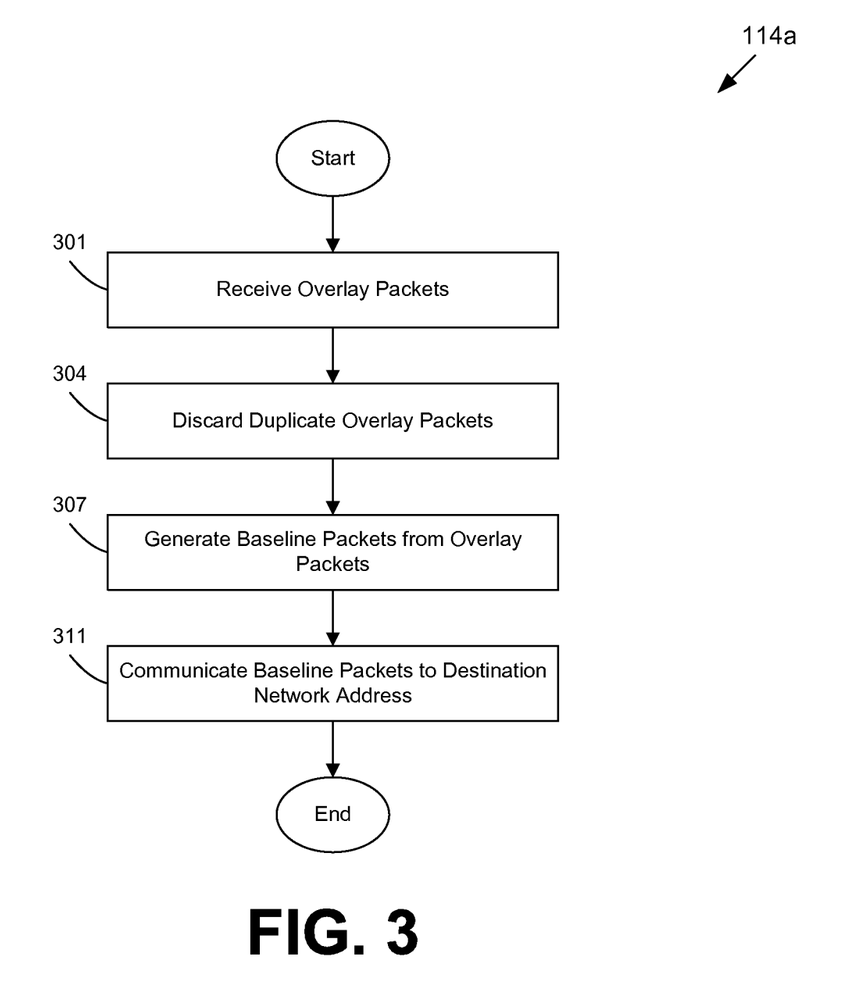
FIG. 3 is a flowchart illustrating one example of functionality implemented as portions of an edge node 114a in the networked environment of FIG. 1A or FIG. 1B according to various embodiments of the present disclosure.

Moving on to FIG. 3, shown is a flowchart that provides one example of the operation of a portion of the edge node 114a according to various embodiments. It is understood that the flowchart of FIG. 3 provides merely an example of the many different types of functional arrangements that may be employed to implement the operation of the portion of the edge node 114a as described herein. As an alternative, the flowchart of FIG. 3 may be viewed as depicting an example of elements of a method implemented in the edge node 114a according to one or more embodiments.

Beginning with box 301, the edge node 114a receives overlay packets 127 (FIG. 1A) for communication to a network destination address via one or more relay nodes 111a-n (FIG. 1A) of the overlay network 107 (FIG. 1A). As multiple copies of a given overlay packet 127 have been communicated via multiple paths of the overlay network 107 as described above, the edge node 114a discards duplicate instances of the received overlay packets 127 in box 304. This may include, for example, tracking sequence numbers, hash values or other identifiers encoded in overlay packet 127 metadata 131. A duplicate overlay packet 127 may be identified by determining if the identifier of an overlay packet 127 corresponds to a previously received overlay packet 127. Additionally, the edge node 114a may discard those packets failing a data verification, integrity or validation operation. The duplicate overlay packets 127 may then be deleted or otherwise discarded such that they are not forwarded to a destination address, as will be described below.

After discarding duplicate overlay packets 127, the edge node 114a generates baseline packets 121 (FIG. 1A) from the retained overlay packets 127 in box 307. This may include applying a decryption algorithm to the overlay packets 127 or the payloads of the overlay packets 127. In embodiments in which the baseline packets 127 were split for encoding into overlay packets 127, generating the baseline packets 127 may include reassembling the baseline packets 127 from the payloads of multiple overlay packets 127.

Next, in box 311, the edge node 114a communicates the baseline packets 127 to a destination network address. In some embodiments, the baseline packets 121 may be communicated to a server application 117 (FIG. 1A) or other application executed in a server computing environment 101 (FIG. 1A) communicatively coupled to the edge node 114a. For example, the edge node 114a may serve as a router, switch, access point, modem, or other networking device in communication with the server computing environment 101. In other embodiments, the server computing environment 101 may serve as the edge node 114a, and the baseline packets 121 are received by a process or application distinct from a server application 117 or other application executed within the server computing environment 101. After forwarding the baseline packets 121 to the destination network address, the process ends.

Figure 4:
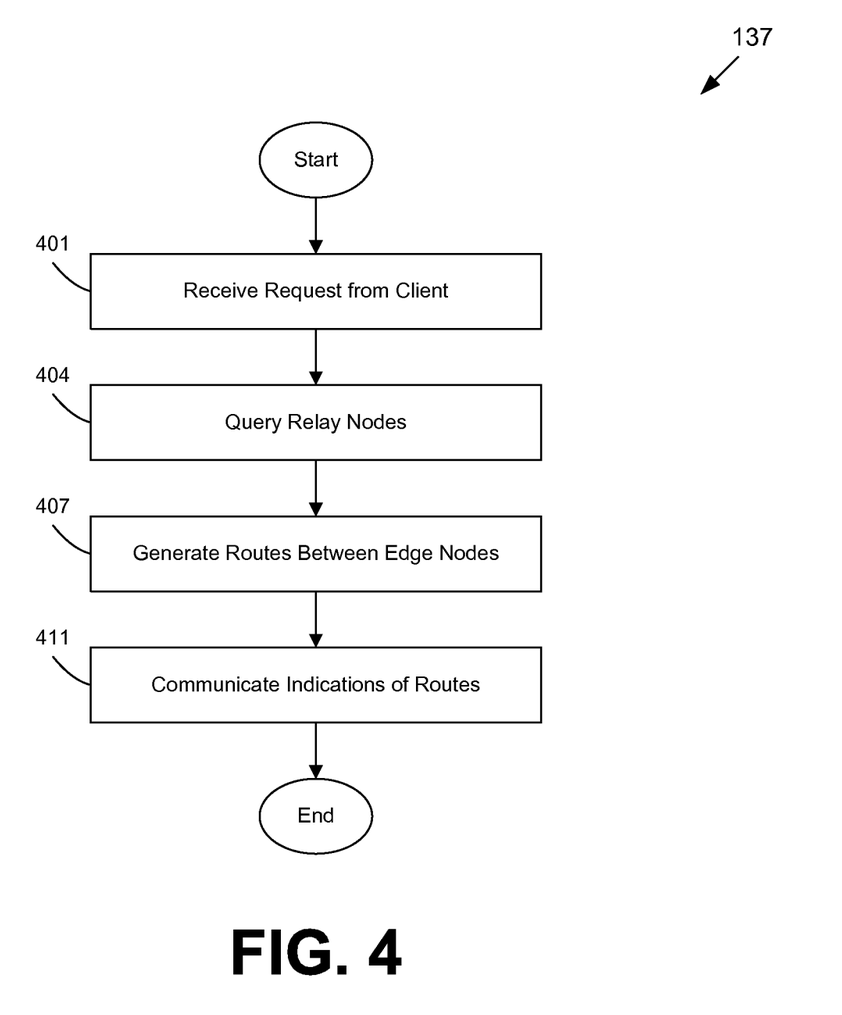
FIG. 4 is a flowchart illustrating one example of functionality implemented as portions of a controller application 137 executed in a controller computing environment in the networked environment of FIG. 1B according to various embodiments of the present disclosure.

Turning now to FIG. 4, shown is a flowchart that provides one example of the operation of a portion of the controller application 137 according to various embodiments. It is understood that the flowchart of FIG. 4 provides merely an example of the many different types of functional arrangements that may be employed to implement the operation of the controller application 137 as described herein. As an alternative, the flowchart of FIG. 4 may be viewed as depicting an example of elements of a method implemented in the controller computing environment 134 (FIG. 1B) according to one or more embodiments.

Beginning with box 401, the controller application 137 receives a request from a client 104 (FIG. 1B) to generate a plurality of routes between an edge node 114b (FIG. 1B) communicatively coupled to the client 104 and an edge node 114a (FIG. 1B) via the overlay network 107 (FIG. 1B). Next, in box 404, the controller application 137 queries relay nodes 111a-n (FIG. 1B) of the overlay network for relay data 141 (FIG. 1B). Using the relay data 141, in box 407, the controller application generates routes between the edge node 114b and 114a.

In some embodiments, the routes may be generated to minimize a latency between the edge node 114a and 114b. In other embodiments, the routes may be generated to avoid or preferably avoid the use of relay nodes 111a-n having a pending workload meeting or exceeding a threshold, or a capacity meeting or falling below another threshold.

After generating the routes, in box 411, the controller application 137 communicates indications of the routes. In some embodiments, this includes communicating an indication of the routes to the edge node 114b, such that overlay packets 127 may be encoded with an indication of a respective route. This allows the overlay packets 127 (FIG. 1B) to be communicated to relay nodes 111a-n with an indication of a communications path through the overlay network 107.

In other embodiments this may include communicating, to the edge node 114b, an indication of one or more first relay nodes 111a-n in the path. In such an embodiment, the controller application 137 may also communicate to relay nodes 111a-n included in the routes an indication of a respective subsequent relay node 111a-n to which overlay packets 127 should be forwarded. Thus, the edge node 114b and relay nodes 111a-n are only instructed of a next node to which overlay packets 127 should be forwarded. In some embodiments, the forwarding instructions to the relay nodes 111a-n may be specific to overlay packets 127 to or from a particular client 104, client application 124, or destination edge node 114a. Thus, relay nodes 111a-n would select the next relay node 111a-n according to the received instructions and a source or destination of the overlay packets 127.

After communicating the indications of routes, the process ends. However, it is understood that the operations of boxes 404, 407 and 411 may be repeated to receive updated relay data 141 for the relay nodes 111a-n, and then indicate updated routes to the relay nodes 111a-n.

Figure 5A:
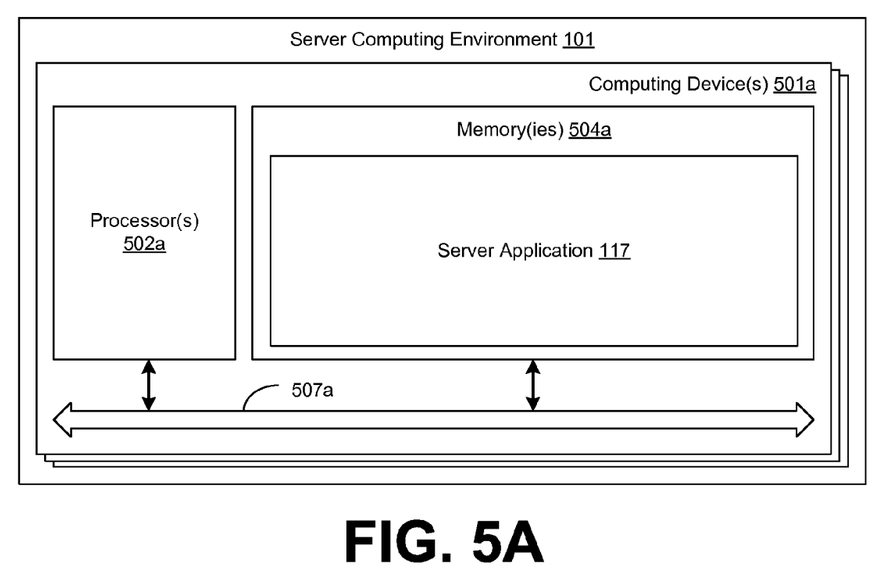
FIG. 5A is a schematic block diagram that provides one example illustration of a server computing environment employed in the networked environment of FIG. 1A or FIG. 1B according to various embodiments of the present disclosure.
Figure 5B:
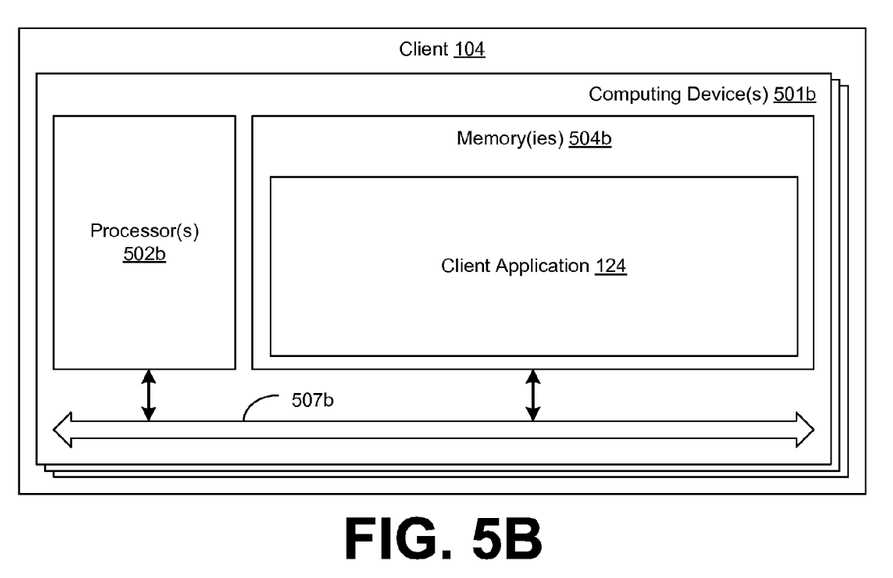
FIG. 5B is a schematic block diagram that provides one example illustration of a client employed in the networked environment of FIG. 1A or FIG. 1B according to various embodiments of the present disclosure
Figure 5C:
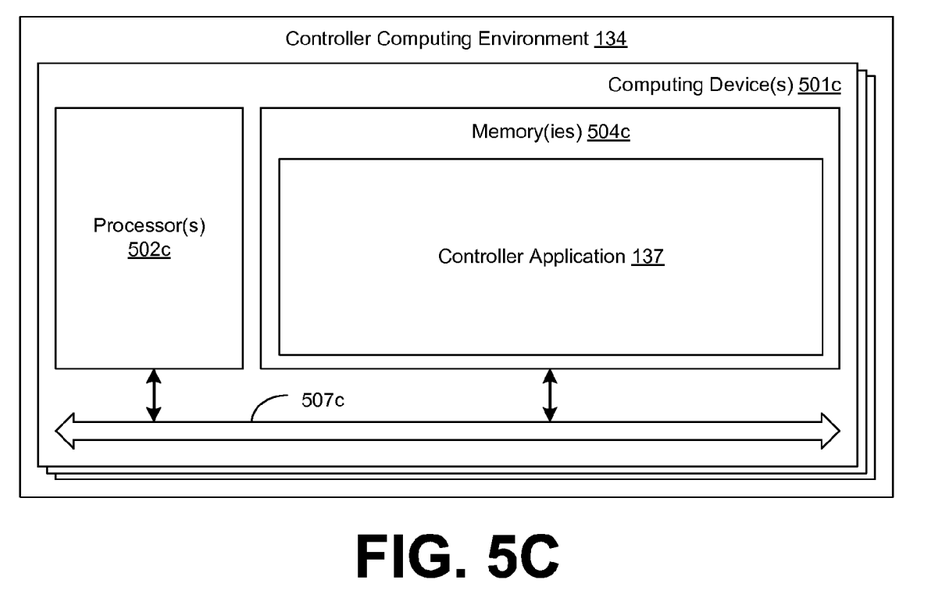
FIG. 5C is a schematic block diagram that provides one example illustration of a controller computing environment employed in the networked environment of FIG. 1A or FIG. 1B according to various embodiments of the present disclosure.

With reference to FIGS. 5A, 5B and 5C, shown are schematic block diagrams of the server computing environment 101, client 104 and controller computing environment 134 according to an embodiment of the present disclosure. The server computing environment 101, client 104, and controller computing environment each include one or more computing devices 501a, 501b or 501c, respectively. Each computing device 501a/b/c includes at least one processor circuit, for example, having a processor 502a/b/c and a memory 504a/b/c, both of which are coupled to a local interface 507a/b/c. To this end, each computing device 501a/b/c may comprise, for example, at least one server computer or like device. The local interface 507a/b/c may comprise, for example, a data bus with an accompanying address/control bus or other bus structure as can be appreciated.

Stored in the memory 504a/b/c are both data and several components that are executable by the processor 502a/b/c. In particular, stored in the memory 504a/b/c and executable by the processor 502a/b/c are server application 117, client application 124 or controller application 137, respectively, and potentially other applications. Also stored in the memory 504a/b/c may be a data store and other data. In addition, an operating system may be stored in the memory 504a/b/c and executable by the processor 502a/b/c.

It is understood that there may be other applications that are stored in the memory 504a/b/c and are executable by the processor 502a/b/c as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504a/b/c and are executable by the processor 502a/b/c. In this respect, the term "executable" means a program file that is in a form that can ultimately be run by the processor 502a/b/c. Examples of executable programs may be, for example, a compiled program that can be translated into machine code in a format that can be loaded into a random access portion of the memory 504a/b/c and run by the processor 502a/b/c, source code that may be expressed in proper format such as object code that is capable of being loaded into a random access portion of the memory 504a/b/c and executed by the processor 502a/b/c, or source code that may be interpreted by another executable program to generate instructions in a random access portion of the memory 504a/b/c to be executed by the processor 502a/b/c, etc. An executable program may be stored in any portion or component of the memory 504a/b/c including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504a/b/c is defined herein as including both volatile and nonvolatile memory and data storage components. Volatile components are those that do not retain data values upon loss of power. Nonvolatile components are those that retain data upon a loss of power. Thus, the memory 504a/b/c may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502a/b/c may represent multiple processors 502a/b/c and/or multiple processor cores and the memory 504a/b/c may represent multiple memories 504a/b/c that operate in parallel processing circuits, respectively. In such a case, the local interface 507a/b/c may be an appropriate network that facilitates communication between any two of the multiple processors 502a/b/c, between any processor 502a/b/c and any of the memories 504a/b/c, or between any two of the memories 504a/b/c, etc. The local interface 507a/b/c may comprise additional systems designed to coordinate this communication, including, for example, performing load balancing. The processor 502a/b/c may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2, 4 and 4 show the functionality and operation of an implementation of portions of the edge nodes 114a/b or controller computing environment 134. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2, 3 and 4 show a specific order of execution, it is understood that the order of execution may differ from that which is depicted. For example, the order of execution of two or more blocks may be scrambled relative to the order shown. Also, two or more blocks shown in succession in FIGS. 2, 3 and 4 may be executed concurrently or with partial concurrence. Further, in some embodiments, one or more of the blocks shown in FIGS. 2, 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 502a/b/c in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 501a/b/c, or in multiple computing devices in the same server computing environment 101, client 104 or controller computing environment 134. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the Therefore, the following is claimed:

1. A system, comprising:
at least one first computing device configured to at least:
receive a plurality of baseline packets addressed to at least one destination address;
generate a plurality of overlay packets from the plurality of baseline packets, the plurality of overlay packets comprising metadata to facilitate a communication of the plurality of overlay packets via a plurality of paths of an overlay network to the at least one destination address;
communicate the plurality of overlay packets to each of at least one first relay node corresponding to each of the plurality of paths of the overlay network;
at least one second computing device configured to at least:
receive the plurality of overlay packets from the overlay network;
generate the plurality of baseline packets from the plurality of overlay packets;
communicate the plurality of baseline packets to the at least one destination network address;
at least one third computing device configured to at least:
obtain, from a plurality of relay nodes of the overlay network, relay data;
generate, based at least in part on the relay data, the plurality of paths of the overlay network;
communicate, to at least the at least one first computing device, an indication of at least the at least one first relay node corresponding to each of the plurality of paths of the overlay network; and
communicate, to a subset of the plurality of relay nodes included in the plurality of paths, an indication of a respective next one of the subset of the plurality of relay nodes included in the plurality of paths.

2. The system of claim 1, wherein generating the plurality of overlay packets comprises splitting the plurality of baseline packets into a plurality of data portions, wherein the plurality of overlay packets comprise a payload corresponding to a respective one of the plurality of data portions.

3. The system of claim 2, wherein the plurality of baseline packets are split based at least in part on the plurality of overlay packets conforming to a Maximum Transmission Unit size of at least a portion of the overlay network.

4. The system of claim 1, wherein the at least one second computing device is configured to discard a duplicated one of the plurality of overlay packets received from the overlay network.

5. The system of claim 4, wherein the at least one second computing device is configured to identify the duplicated one of the plurality of overlay packets based at least in part on a sequence number or a hashing algorithm applied to the plurality of overlay packets.

6. The system of claim 1, wherein the at least one first relay node is included in a plurality of relay nodes of the overlay network, and the at least one computing device is further configured to at least:
identify the plurality of paths based at least in part on a path finding operation applied to the plurality of relay nodes; and
select the at least one first relay node according to the identified plurality of paths.

7. The system of claim 5, wherein the at least one computing device is further configured to at least encode an indication of a corresponding one of the plurality of paths in the metadata.

8. The system of claim 1, wherein the at least one third computing device is further configured to at least repeat, at a predefined interval or in response to a request, the obtaining of the relay data and the communicating of the indication of the respective next one of the subset of the plurality of relay nodes included in the plurality of paths.

9. A method, comprising:
receiving, by at least one first computing device, a plurality of baseline packets addressed to at least one destination address;
generating, by the at least one first computing device, a plurality of overlay packets from the plurality of baseline packets, the plurality of overlay packets comprising metadata to facilitate a communication of the plurality of overlay packets via a plurality of paths of an overlay network to the at least one destination address;
communicating, by the at least one first computing device, the plurality of overlay packets to each of at least one first relay node corresponding to each of the plurality of paths of the overlay network;
receiving, by at least one second computing device, the plurality of overlay packets from the overlay network;
generating, by the at least one second computing device, the plurality of baseline packets from the plurality of overlay packets;
communicating, by the at least one second computing device, the plurality of baseline packets to the at least one destination network address;
obtaining, by the at least one third computing device, from a plurality of relay nodes of the overlay network, relay data;
generating, by the at least one third computing device, based at least in part on the relay data, the plurality of paths of the overlay network;
communicating, by the at least one third computing device, to at least the at least one first computing device, an indication of at least the at least one first relay node corresponding to each of the plurality of paths of the overlay network; and
communicating, by the at least one third computing device, to a subset of the plurality of relay nodes included in the plurality of paths, an indication of a respective next one of the subset of the plurality of relay nodes included in the plurality of paths.

10. The method of claim 9, wherein generating the plurality of overlay packets comprises splitting the plurality of baseline packets into a plurality of data portions, wherein the plurality of overlay packets comprise a payload corresponding to a respective one of the plurality of data portions.

11. The method of claim 10, wherein the plurality of baseline packets are split based at least in part on the plurality of overlay packets conforming to a Maximum Transmission Unit size of at least a portion of the overlay network.

12. The method of claim 9, further comprising discarding, by the at least one second computing device, a duplicated one of the plurality of overlay packets received from the overlay network.

13. The method of claim 12, further comprising identifying, by the at least one second computing device, the duplicated one of the plurality of overlay packets based at least in part on a sequence number or a hashing algorithm applied to the plurality of overlay packets.

14. The method of claim 9, wherein the at least one first relay node is included in a plurality of relay nodes of the overlay network, and the method further comprises:
  identifying, by the at least one first computing device, the plurality of paths based at least in part on a path finding operation applied to the plurality of relay nodes; and
  selecting, by the at least one first computing device, the at least one first relay node according to the identified plurality of paths.

15. The method of claim 14, wherein the method further comprises encoding, by the at least one first computing device, an indication of a corresponding one of the plurality of paths in the metadata.

16. The method of claim 9, wherein the at least one first relay node is configured to select a next relay node from a plurality of relay nodes based at least in part on at least one of latency data or capacity data for the plurality of relay nodes.

17. The method of claim 9, further comprising generating, by the at least one first computing device, the plurality of baseline packets.

18. The method of claim 9, wherein the plurality of baseline packets are generated by a second process executed in another computing device communicatively coupled to the at least one first computing device.

\* \* \* \* \*